July 1, 1924.
W. E. TULLAR
1,499,427
CONTROLLING MEANS FOR MOTOR DRIVEN VEHICLES
Filed Feb. 11, 1922   4 Sheets-Sheet 1
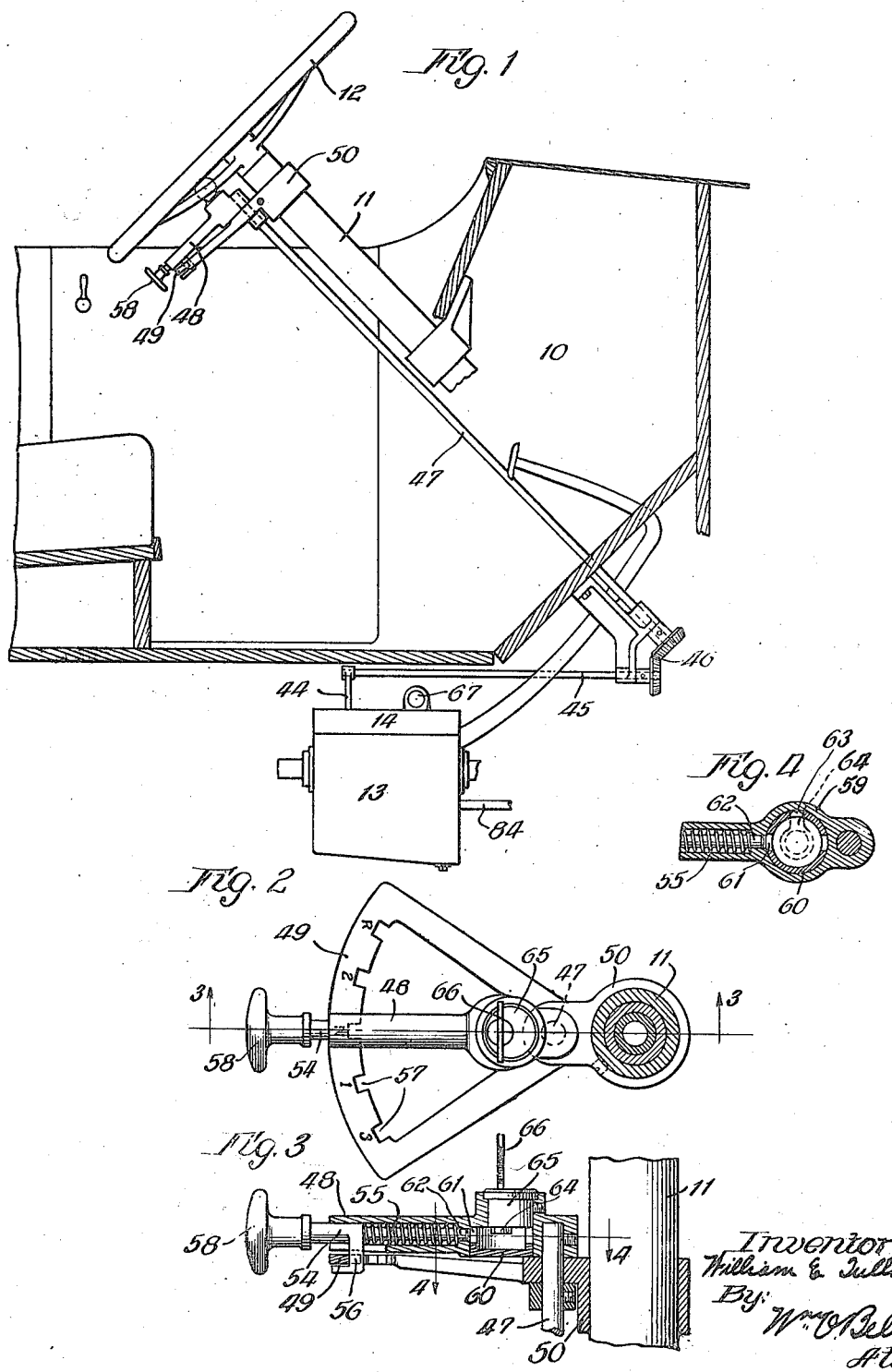

July 1, 1924.
W. E. TULLAR
1,499,427
CONTROLLING MEANS FOR MOTOR DRIVEN VEHICLES
Filed Feb. 11, 1922    4 Sheets-Sheet 2
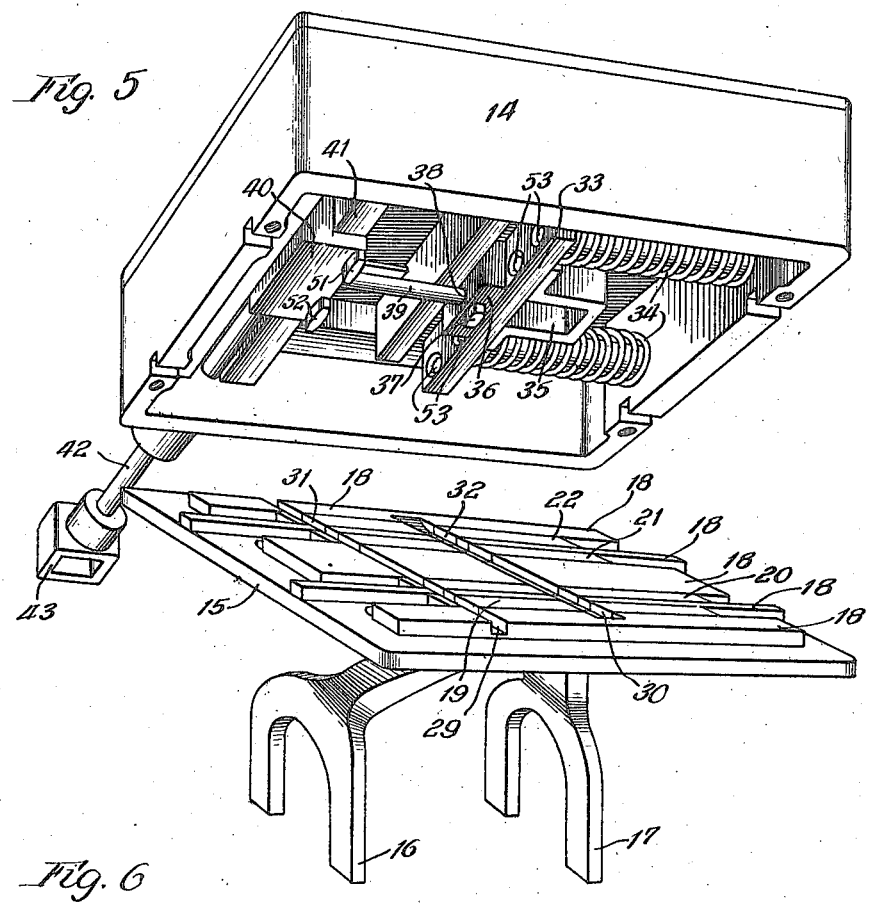
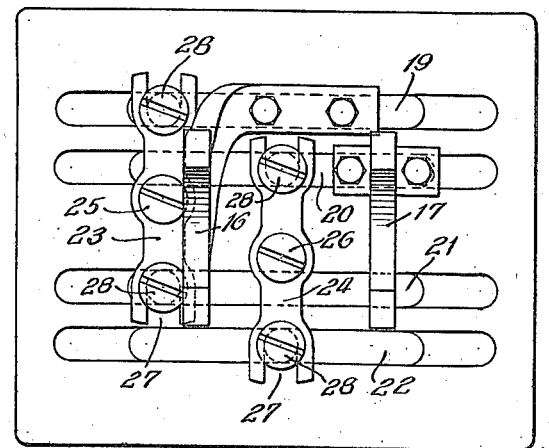
Inventor:
William E. Tullar
By:

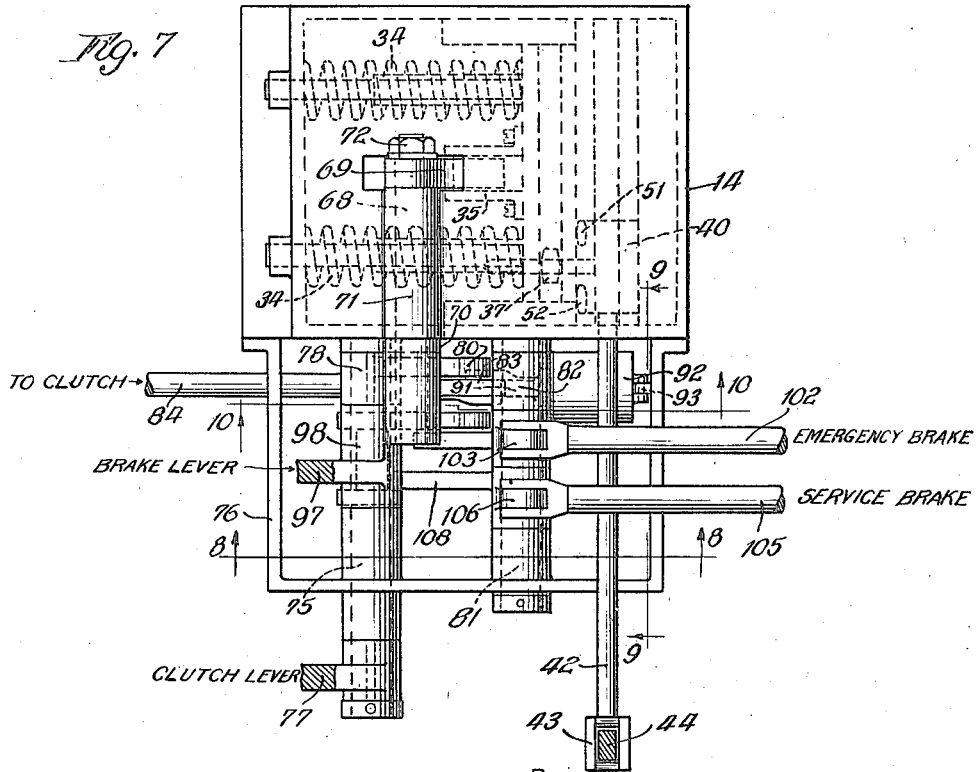
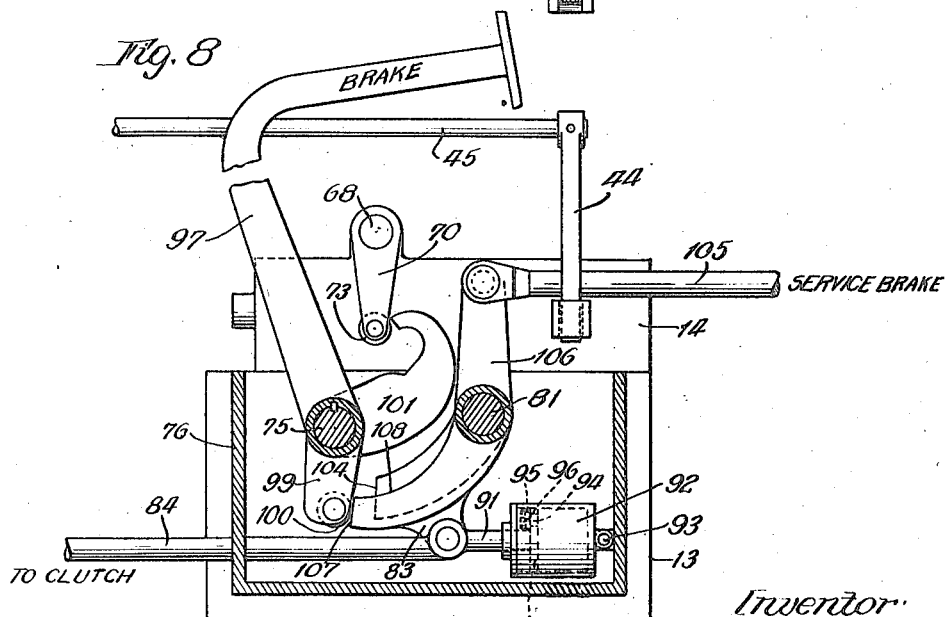

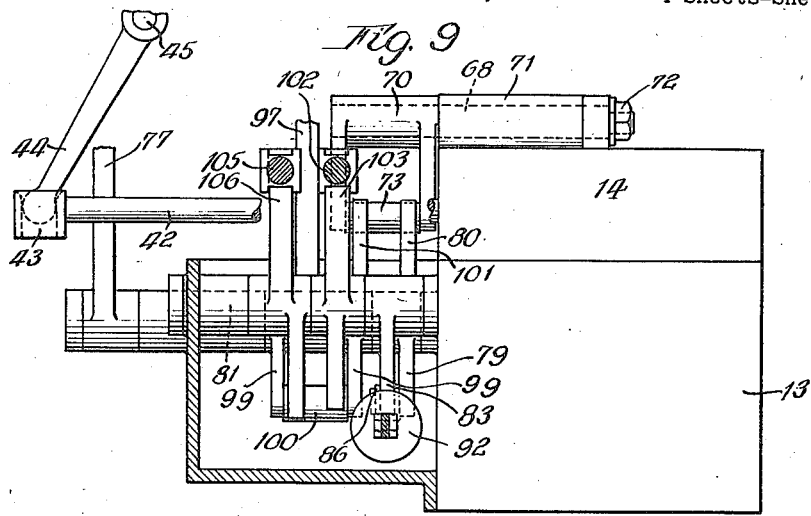
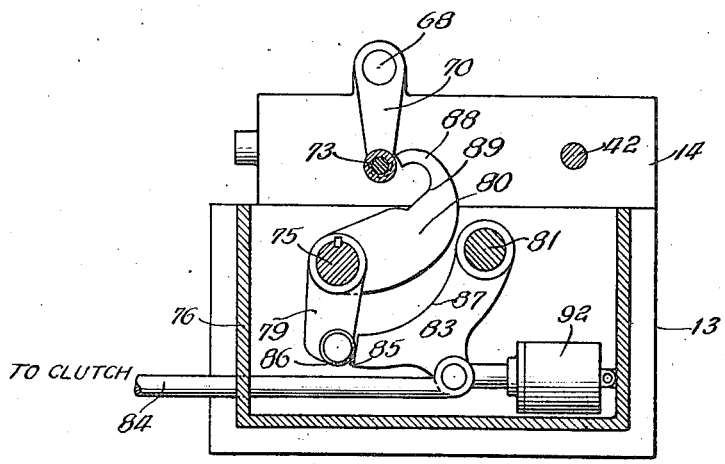

Patented July 1, 1924.

1,499,427

UNITED STATES PATENT OFFICE.

WILLIAM E. TULLAR, OF CHICAGO, ILLINOIS.

CONTROLLING MEANS FOR MOTOR-DRIVEN VEHICLES.

Application filed February 11, 1922. Serial No. 535,710.

*To all whom it may concern:*

Be it known that I, WILLIAM E. TULLAR, a citizen of the United States, residing at Chicago, in the county of Cook and State of Illinois, have invented certain new and useful Improvements in Controlling Means For Motor-Driven Vehicles, of which the following is a specification.

This invention relates generally to brake and speed changing mechanisms for automobiles of the type disclosed in my Patents No. 1,209,782, granted December 26, 1916, No. 1,212,286, granted January 16, 1917, and has for its principal object to simplify and improve the means for operating these mechanisms and co-ordinating their movements.

Another object of the invention is to provide an improved lock for controlling the brake and speed changing mechanisms.

Another object of the invention is to control the movement of the clutch so as to make it engage gradually while permitting it to be disengaged rapidly.

Other objects will become apparent as the description is read in connection with the accompanying drawing illustrating a selected embodiment of the invention, and in which—

Fig. 1 is a fragmentary view of an automobile chassis with the invention applied thereto;

Fig. 2 is a plan view of a hand lever and segment for operating the speed changing mechanism;

Fig. 3 is a transverse section on the line 3—3 of Fig. 2.

Fig. 4 is a transverse section on the line 4—4 of Fig. 3;

Fig. 5 is a perspective view of the gear shifting mechanism;

Fig. 6 is an inverted plan view of this mechanism;

Fig. 7 is a plan view showing the relation between the gear shifting mechanism and the brake and clutch operating levers; and Figs. 8, 9 and 10 are vertical sections on the lines 8—8, 9—9 and 10—10 of Fig. 7.

Referring to Fig 1, 10 indicates a portion of the body of an automobile, 11 the steering column, 12 a steering wheel and 13 a transmission. 14 indicates a casing for the gear shifting mechanism shown in detail in Fig. 5.

In this figure, the bottom 15 of the casing has been slightly removed and tilted to better illustrate the relation between the parts therein. 16 and 17 indicate gear shifting forks adapted to extend into the transmission 13 and shift the selected gear to give the desired speed and direction to the automobile. The upper side of the bottom 15 is provided with a plurality of guides 18 between which are slidably mounted four bars 19, 20, 21 and 22. On the lower side of the bottom, a pair of levers 23 and 24 are pivoted on bolts 25 and 26. Each end of each of these levers is forked as indicated at 27 and each of the slides 19, 20, 21 and 22 is provided with a pin 28 adapted to rest between the arms of a fork 27 and cause the bars to move in pairs. Referring to Fig. 6 it will be seen that bars 19 and 21 are connected by the lever 23 so that if the bar 19 is moved to the right in that figure, the bar 21 will move to the left, and vice versa, also bars 20 and 22 are similarly connected by the lever 24.

The guides 18 on the upper side of the bottom are provided with transverse grooves 29 and 30 and the bars 19, 20, 21 and 22 have notches 31 and 32 corresponding with these grooves and adapted to align therewith as shown in Fig. 5. Within the casing 14 is a track 33 adapted to move lengthwise to the casing under the action of springs 34 or a lever arm working in the yoke 35, as will be later described. A selector slide 36 is mounted to move lengthwise to the track 33 and transverse to the casing and carries a selector finger 37 adapted to run in the aligned groove 30 and notches 32. The selector slide is provided with an opening 38 adapted to receive a pin 39 carried by a locking slide 40 running on a fixed track 41 transversely to the casing and adjacent to the rear end thereof. The locking slide 40 is connected with a link 42 having at its free end a yoke 43 adapted to receive the arm 44 (Figs. 1, 7 and 8) carried by a rock shaft 45 and driven through the bevel gears 46 from a shaft 47 mounted adjacent to the steering column 11 and operated by a lever 48 running over the segment 49 supported on the steering column by the collar 50.

By this means it will be seen that the driver can control the position of the locking slide 40 and the selector slide 36 from the steering wheel so as to place the selector finger 37 within the notch 32 in either of the four bars, 19, 20, 21 and 22 which he may elect. The construction is such that the finger 37 will align with the slots 32 and the groove 30 when the springs 34 are compressed, therefore, if the selector finger is placed in one of the notches 32 and the track 33 permitted to move to the left in Fig. 5 under the action of the springs 34, the particular bar with which the fingers engage will be moved to the left. If, for example, the bar 19 is the selected one, the shifter fork 16 carried thereby will be moved to the left in Fig. 5, so as to shift a particular gear in the transmission. If, however, the bar 21 be selected, its movement to the left in Fig. 5 will compel the bar 19 to move to the right and the shifter fork 16 will therefore move another gear in the transmission. The operation is similar with respect to the bars 20 and 22 and the shifter fork 17.

The locking slide 40 carries a pair of fingers 51 and 52 adapted to run in the groove 29 and the notches 31. The relation between the fingers 37, 51 and 52 is such that when the finger 37 is engaged with either the bar 19 or 21, the fingers 51 and 52 will lock the bars 20 and 22 against movement and correspondingly, when the finger 37 is engaged with either the bar 20 or 22, the fingers 51 and 52 will lock bars 19 and 21 against movement. The track 33 is provided with a plurality of openings 53 corresponding to the position of the pin 39 when the finger 37 is in the notch 32 in each of the bars 19, 20, 21 and 22 so that when the track 33 is moved to the left under the action of the springs 34 to shift a gear, the pin 39 and therefore the locking slide 40 and the hand lever 48 are locked to the track 33 so that the finger 37 cannot be moved until the gears are returned to neutral by bringing the finger back into alignment with the groove 30.

The operation of this gear shifting mechanism is substantially the same as that shown in my prior patent and a detailed description of its various movements is not considered necessary herein.

The hand lever 48 (Figs. 1, 2, 3 and 4) is hollow and equipped with the latch bolt 54 surrounded by a helical spring 55 and carrying on its lower side a hooked arm 56 adapted to engage in the notches 57 in the segment 49. When the transmission affords three speeds forward, one reverse and one neutral position, five notches will be required and they may be arranged and numbered as indicated in Fig. 2. In order to shift from one notch to another, the knob 58 on the latch bolt 54 is pressed towards the shaft 47 and the hand lever 48 swung until the arm 56 is in position to enter the slot corresponding to the gear desired, when the knob is released and the spring 55 will move the latch bolt to secure the lever in that position. In order to lock the hand lever in a selected position, I provide the lever with an enlargement 59 (Figs. 2 and 4) and journal therein a cup-like locking member 60 having a notch 61 in one side adapted to permit the end 62 of the latch bolt 54 to move to the right in Figs. 3 and 4, and a notch 63 adapted to receive the operating lever 64 of a cylinder lock 65 equipped with a key 66. By this arrangement the hand lever 48 can be locked in any desired position with reference to the segment 49 and when locked in neutral, for example, the car cannot be driven away because the selector finger 37 cannot be moved to gear shifting position, and as will be hereinafter explained, the brakes cannot be released. The presence of the locking member 60 moved by the lock to a position either permitting or preventing the latch bolt to be operated is of great importance practically, because any attempt to unlock the car by violence to the cylinder lock or to the enlargement of the lever in which it is seated will result in this lock element being more or less permanently jammed in its seat so that the car cannot be unlocked even after the cylinder lock has been entirely removed.

The track 33 is moved to compress the springs 34 and bring the gears to neutral by the action of a rocker 67 mounted on top of the casing 14 and consisting of a shaft 68 having an arm 69 in engagement with the yoke 35 and an arm 70 for co-operation with the brake and clutch operating mechanism to be described. As shown in Figs. 7 and 8, the shaft 68 is journaled in a boss 71 on top of the casing 14 and the arm 69 is secured thereon by the nut 72. The arm 70 is permanently secured to the shaft 68 and is conveniently made forked so as to carry the roller 73 between the ends of the prongs.

The clutch and brake levers here shown in the form of pedals are mounted to rotate about the axis of the shaft 75 extending transversely to the casing 14 and supported in a suitable bracket or housing 76 at the left hand side thereof. The clutch pedal 77 is fixed to the lower end of the shaft 75 in Fig. 7 and the opposite end of the shaft carries a sleeve 78 which forms the hub for a short lever arm 79 and the hooked lever arm 80 (Figs. 7, 9 and 10). The pedal 77, the shaft 75, the sleeve 78 and the levers 79 and 80 are in the form of a bell crank lever by which pressure on the foot piece of the pedal serves to operate the clutch and the gear shifting or speed changing mechanism. A shaft 81, extending parallel to the shaft 75 forms a bearing for the hub 82 of a clutch operating lever 83 which is connected by a rod 84 with the clutch. The lever 83 has a working face 85 for co-operation with a roller 86 carried by the arm 79 for disengaging the clutch. It also has a holding surface 87 curved on the arc of a circle whose center may lie in the axis of the shaft 75 for co-operation with the roller 86 to hold the clutch in disengaged position as the arm 80 operates the rocker 67 to move the gears to neutral. The arm 80 is provided with a hook 88 which catches over the roller 73 when the rocker 70 has moved far enough to bring the gears to neutral.

In operation, the clutch lever or pedal is pressed forwardly rocking the shaft 75 and the arms 79 and 80. The arm 79 moves the roller 86 into engagement with the working face 85 which rotates the clutch operating lever 83 about the shaft 81, releasing the clutch and bringing the center of the holding surface 87 into coincidence with the axis of the shaft 75. The roller 86 moves off the working surface 85 onto the holding surface 87 and retains the clutch in released position while the face 89 of the arm 80 strikes the roller 73 and moves the rocker 70 to compress the springs 34 and bring the gears to neutral. The arrangement is such that the face 89 engages the roller 73 just as the roller 86 starts onto the curved holding face 87 and when the gears have been brought to neutral the hook 88 has coupled the arm 80 to the arm 70 so that if the selector finger has been moved to neutral position the clutch pedal cannot be returned to normal position until the selector finger 37 is placed in one of the notches 32 to permit a gear to be engaged. When the finger has been so placed, the springs 34 move the track 33 and permit the rocker 70 to return to the position shown in Fig. 10. The gears are meshed by the time the roller 86 has reached the left end of the curved surface 87 in Fig. 10 and is ready to co-operate with the working surface 85 so that the clutch is engaged after the selected gears have been meshed.

It is apparent that if the hook 88 were not provided for coupling the arm 80 to the arm 70, the clutch will become engaged unless pressure is exerted upon the foot pedal. Then, with the clutch engaged, if the finger 37 should be moved from its neutral position to a position wherein it permitted one of the bars 19, 20, 21 and 22 to mesh certain of the gears of the transmission 13, it is readily understood that there would be great danger of injuring the gears. However, with the construction shown and described, the clutch is held out of engagement whenever the gears of the gear transmission are being shifted.

The selector slide 36 can be shifted only when the gears are in neutral and the notches 30, 32 in alignment. With the gears in neutral and the notches 30, 32 in alignment, the finger 37 can be positioned in one of the notches 30 of the fixed guides 18 and the action of the springs will be blocked. The control elements will then be rigidly secured against operation and the selector finger 37 may be considered to be in a neutral position. The clutch can never be engaged without shifting one of the bars 19, 20, 21 or 22 and engaging certain gears.

From this it will be clear that if the clutch pedal is pressed forward to release the clutch and return the gears to neutral and the hand lever 48 is moved to neutral position shown in Fig. 2 and locked by turning the key 66, the cluch cannot be re-engaged and the gears cannot be shifted.

In order to prevent the clutch from being engaged too quickly, I have connected a piston 90 (Figs. 8 and 10) by a connecting rod 91 with the clutch operating lever 83 and mounted the piston in a cylinder 92 pivoted at 93 to the casing 76. The piston is provided with a large port 94 that will permit fluid in the cylinder to pass so freely that the clutch can be disengaged without any apparent additional resistance. A disc valve 95 is supported in position to engage a seat controlling the port 94 upon reverse movement of the clutch and close the port 94. By providing the valve disk with a relatively small port 96 the speed with which the clutch can be engaged will be controlled by the speed with which the fluid can pass through this relatively small port. The port may be selected to suit particular conditions or it may be made adjustable in a manner understood by those skilled in the art. It is sufficient for the purpose of this invention if there is a large port that will permit the piston to move freely to the right in Fig. 8 as the clutch is disengaged and a valve that will close this port upon reverse motion of the clutch and permit a relatively slow movement towards engaged position.

The brake pedal 97 is carried by a sleeve 98 mounted on the shaft 75 (Figs. 7 and 8) which also carries a lever arm 99 equipped with a roller 100 and a hooked arm 101 similar to the hooked arm 80 and located so as to engage the roller 73 of the rocker 67. The emergency brake is connected by the brake rod 102 (Fig. 7) with the emergency brake operating lever 103 mounted on the shaft 81 and having the working surface 104 for co-operation with the roller 100. Similarly, the service brake is connected by brake rod 105 with the service brake operating lever 106 also pivoted on the shaft 81 and having the working face 107 and the curved holding face 108 similar to the working and holding faces 85 and 87 shown in Fig. 10 and described in connection with the clutch operating lever. The hooked arm 101 co-operates with the roller 73 in the same manner as the hooked arm 80 and moves the gears to neutral when the emergency brake is applied. The initial movement of the brake pedal 97 causes the roller 100 on the arm 99 to operate the service brake operating lever 106 to apply the service brake. When these service brakes are fully applied, the roller 100 rolls onto the holding surface 108 and maintains the pressure while acting against the working surface 104 of the emergency brake operating lever to apply the emergency brake. The arrangement is such that the hooked arm 101 begins to move the rocker 70 as soon as the roller 100 begins to apply the emergency brakes. Consequently the service brakes can be applied and released as usual, without interfering with the engagement of the gears, but upon application of the emergency brakes, the gears are returned to neutral.

The hooked arm 101 becomes locked to the rocker 70 through the roller 73 when the emergency brakes are applied so that if the selector finger is moved to neutral position and the hand lever 48 locked in the neutral notch as above explained, both the service and emergency brakes are locked in applied condition and cannot be released until a gear has been engaged.

The embodiment of the invention here disclosed is very simple and practical and especially suited for application to automobiles using sliding gear transmission. A single lever or pedal serves to operate the service and emergency brakes as well as to bring the gears to neutral upon the application of the emergency brakes. Another single lever or pedal releases the clutch and retains it in released position while bringing the gears to neutral. Both these levers are readily locked in operating position by moving the selector finger 37 to neutral position and locking the hand lever 48 by means of a key 66.

The presence of the movable lock element 60 makes it practically impossible for a thief to overcome the cylinder lock 65 by the usual destructive methods, for very slight distortion of the enlargement 59 is sufficient to bind the lock element and prevent it from being operated even after the lock 65 has been entirely removed.

The piston 90, working in the cylinder 92 and equipped with a valve such as described, forms an effective brake permitting the clutch to be readily released, but causing it to be engaged gradually depending upon the small port so that the strains incident to throwing the clutch in quickly as well as the many accidents due to stopping the motor are effectually avoided.

It will be apparent that various changes may be made in the form, construction and arrangement of the parts without departing from the spirit and scope of my invention or sacrificing any of the material advantages thereof and I reserve the right to make all such changes as fairly fall within the scope of the following claims.

I claim:

1. The combination of a clutch, speed changing mechanism, a pivotally mounted clutch operating lever connected with said clutch, a pivotally mounted speed changing lever connected with said speed changing mechanism, and a single pivotally mounted lever for operating said clutch operating lever and said speed changing lever and comprising an arm continuously engaging said clutch operating lever, the several levers having independent pivotal axes.

2. The combination of a clutch, a clutch operating lever having a working surface and a holding surface, and a second lever having an arm adapted to engage said working surface to release the clutch, and adapted to move along said holding surface to retain the clutch in released position.

3. The combination of a clutch, a clutch operating lever having a working surface and a holding surface, and a second lever having an arm adapted to engage said working surface to release the clutch and adapted to move along said holding surface to retain the clutch in released position, speed changing mechanism and having a second arm adapted to operate said speed changing mechanism as said first mentioned arm moves along said holding surface.

4. The combination of a clutch, speed changing mechanism, a pivotally mounted clutch operating lever connected with said clutch, a pivotally mounted speed changing lever connected with said speed changing mechanism, and a single pivotally mounted lever for operating said clutch operating lever and said speed changing lever successively and comprising an arm continuously engaging said clutch operating lever, the several levers having independent pivotal axes.

5. The combination of a clutch, a pivoted clutch lever, a clutch operating lever having a working surface and a holding surface curved on an arc whose center may lie in the axis of said pivoted clutch lever, speed changing mechanism, a speed changing lever for operating said mechanism, said pivoted clutch lever having an arm adapted to successively engage the working and holding surfaces on said clutch operating lever and having an arm adapted to operate said speed changing lever as the first mentioned arm moves along said holding surface.

6. The combination of a service brake, an emergency brake, a service brake operating lever having a working surface and a holding surface, an emergency brake operating lever, and a third lever having an arm adapted to successively engage said working and holding surfaces and to operate said emergency brake operating lever.

7. The combination of a pivoted lever, a service brake operating lever having a working surface and a holding surface curved on an arc whose center may lie in the axis of said pivoted lever, an emergency brake operating lever, said pivoted lever being adapted to successively engage said working and holding surfaces of said service brake operating lever and being adapted to move said emergency brake operating lever while moving along said holding surface.

8. The combination of a pivoted lever, a service brake operating lever having a working surface and a holding surface curved on an arc whose center may lie in the axis of said pivoted lever, an emergecy brake operating lever, said pivoted lever being adapted to successively engage said working and holding surfaces of said service brake operating lever and adapted to move said emergency brake operating lever while moving along said holding surface, and speed changing mechanism, said pivoted lever being adapted to operate said speed changing mechanism as the emergency brake is applied.

9. The combination of a pivoted lever, an emergency brake operating lever pivoted adjacent thereto, a service brake operating lever pivoted adjacent thereto and having a working surface and a holding surface curved on an arc whose center may lie in the axis of said pivoted lever, an arm carried by said pivoted lever being adapted to operate successively on said working and holding surfaces of said service brake operating lever and adapted to operate said emergency brake operating lever while engaging the holding surface of said service brake operating lever.

10. The combination of a pivoted lever, an emergency brake operating lever pivoted adjacent thereto, a service brake operating lever pivoted adjacent thereto and having a working surface and a holding surface curved on an arc whose center may lie in the axis of said pivoted lever, said pivoted lever having an arm adapted to operate successively on said working and holding surfaces of said service brake operating lever and adapted to operate said emergency brake operating lever while engaging the holding surface of said service brake operating lever, speed changing mechanism, and means for operating said speed changing mechanism including an arm formed on said pivoted lever.

11. The combination of a pivoted lever, an emergency brake operating lever, a service brake operating lever having a working surface and a holding surface, said pivoted lever having an arm for successively co-operating with said working and holding surfaces and for operating said emergency brake operating lever while moving along said holding surface, speed changing mechanism including a rocker, and a hooked arm on said pivoted lever adapted to move said rocker as the emergency brake is applied.

12. The combination of a pivoted lever, a clutch operating lever pivoted adjacent thereto and having a working surface and a holding surface, said pivoted lever having an arm adapted to successively co-operate with said working and holding surfaces, speed changing mechanism including a rocker, and a hooked arm on said pivoted lever adapted to operate said rocker.

WILLIAM E. TULLAR.